W H. SHEPHERD.
Corn Planter.

No. 70,753. Patented Nov. 12, 1867.

Witnesses:
Frank Millward
Fred Bachrens

Inventor:
W. H. Sheppard
By Knight Bros.
Attys.

AM. PHOTO-LITHO. CO. N.Y. (OSBORNE'S PROCESS.)

United States Patent Office.

WILLIAM H. SHEPHERD, OF COLLEGE CORNER, OHIO.

Letters Patent No. 70,753, dated November 12, 1867.

IMPROVEMENT IN CORN-PLANTER.

The Schedule referred to in these Letters Patent and making part of the same.

TO WHOM IT MAY CONCERN:

Be it known that I, WILLIAM H. SHEPHERD, of College Corner, Butler county, Ohio, have invented a new and useful Corn-Planter; and I hereby declare the following to be a full, clear, and exact description thereof, reference being had to the accompanying drawings, making part of this specification.

This invention relates to a corn-planter of great simplicity, and which is intended to plant the corn in equi-distant hills, two rows at a time, being of easy draught for a pair of horses, and requiring but one attendant.

In the accompanying drawings—

A A' are the hind wheels, and B B' the fore wheels. Pivoted on the front axle C is a beam, D; and the said beam has attached to it a box, E, separated by partitions into three receptacles 1, 2, and 3. The box E has pivoted to its front end, on pins $f$, side beams F F', which serve, at their back ends, as bearings for the hind axle G to revolve in. The side beams F F' are slotted at $f'$, to admit of the passage of a screw, $e$, which enters one of the holes $e'$. Upon the axle G is a crank, $g$, which is connected, by a piece, H, to a cross-beam, I, to which are mortised the seed-slides J J'. The seed-slides pass backward and forward through the box E, and, being provided with cavities $j$, serve to carry the corn first from one receptacle, and then from the other, to a drop-hole, $k$, in the floor K of the box E. Affixed to the floor K is a beam, L, having hinged to it a piece, L', carrying drill-spouts M. The piece L' is retained in horizontal position by a chain, $l$, which is held, by a suitable pin, $d$, on the backward projection of the beam D. Upon the partitions of the box E, where the seed-slides J pass through them, are brushes N, to brush back the superabundant corn from the cavities $j$ without doing any injury to the seed. The piece H has a hinge, $h$, to admit of swinging up of the box-block $h'$, by which means the seeding apparatus is thrown out of operation; the block $h'$ being held down, when desired, by a hook, $h''$. The hind wheels A A' are furnished with blocks O upon the insides of their rims, by which the locations of the hills are denoted by the impressions which the said blocks leave upon the ground.

When it is desired to lower the drill-spouts, so as to deposit the seed at a greater depth in the ground, the screws $e$ are withdrawn, and the slot $f$ is brought to a higher one of the holes $e'$, where the screw $e$ is inserted, and the side beams are fastened.

Figure 1:
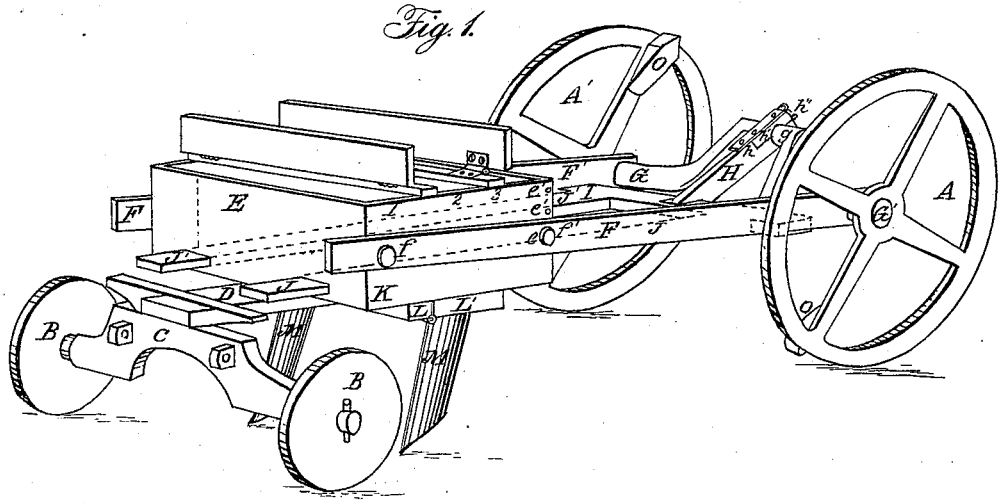
Figure 1 is a perspective view of a corn-planter embodying my improvements.
Figure 2:
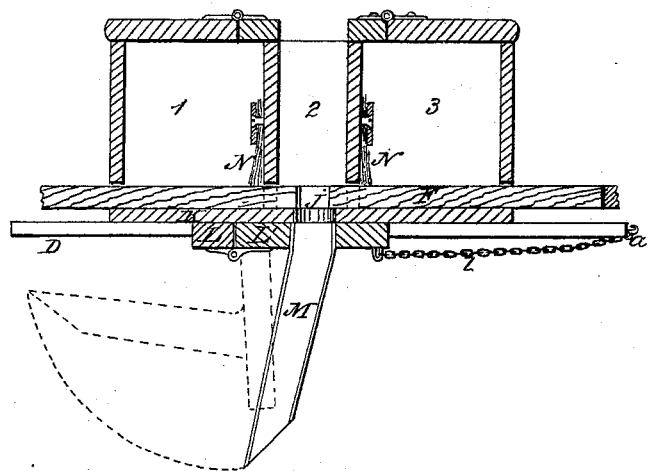
Figure 2 is an enlarged view of the seed-boxes in section through one of the seed-spouts.

When the seed-boxes are furnished with corn, and the drill-spouts are fixed at the proper level to plant, and it is desired to move the machine without depositing seed, the seeding apparatus is disconnected from the crank $g$, and the drill-spouts allowed, by the unhooking of the chain $l$, to swing clear of the ground, as shown by dotted lines in fig. 2. When the machine is so arranged it can be moved around to any distance as easily as a light wagon.

The seed-conducting teeth may be so hung as to rest upon and rise and fall with inequalities of the ground, and be followed by covering-rollers, as in a common drill.

I claim herein as new and of my invention—

1. The grain-dropping frame, consisting of the cross-beam I and grain-slides J J', arranged substantially as shown.

2. I claim the blocks O, to indicate the position of the hills, as set forth.

3. I claim the provision of side beams F F', pin $f$, slot $f'$, and screw $e$, for the purpose stated.

4. I claim the provision for liberating the hinged piece L', allowing of the spouts M to swing clear of the ground, as stated, and for the purpose set forth.

5. I claim the arrangement of the parts $h\ h'\ h''$ for the purpose of disconnecting the seeding-frame from the crank G, as and for the purpose set forth.

In testimony of which invention I hereunto set my hand.

WILLIAM H. SHEPHERD.

Witnesses:
GEO. H. KNIGHT,
SAMUEL KNIGHT.